(No Model.)

J. WHEELOCK.
STEAM ENGINE.

No. 249,864. Patented Nov. 22, 1881.

WITNESSES

INVENTOR
J. Wheelock.

By his Attorney

UNITED STATES PATENT OFFICE.

JEROME WHEELOCK, OF WORCESTER, MASSACHUSETTS.

STEAM-ENGINE.

SPECIFICATION forming part of Letters Patent No. 249,864, dated November 22, 1881.

Application filed July 19, 1881. (No model.)

*To all whom it may concern:*

Be it known that I, JEROME WHEELOCK, of the city and county of Worcester, in the State of Massachusetts, have invented certain new and useful Improvements in Steam-Engines; and I do hereby declare that the following specification, taken in connection with the drawings furnished and forming a part of the same, is a clear, true, and complete description of the several features of my invention.

Although applicable to other engines, my present improvements have been developed with special reference to their use in engines embodying improvements heretofore patented by me.

My present improvements relate, in part, to a novel construction of the bed-plate, involving such an arrangement therein of passages for the live steam and the exhaust-steam that said exhaust-passages will not be unduly exposed to heat from the live steam, and also so that the passages for the latter will not be unduly exposed to cooling and condensing influences from the exhaust-steam.

I have also devised certain improvements in air-cushioned dash-pots, whereby desirable effective service is attained, together with simplicity of construction and durability; and, still further, I have devised certain improvements in the throttle-valve of considerable practical value due to simplicity in construction, and to a capacity for the satisfactory operation common to loose throttles, without the disadvantages heretofore recognized in valves of that class.

To further describe my improvements I will refer to the accompanying drawings, in which—

Figure 2:
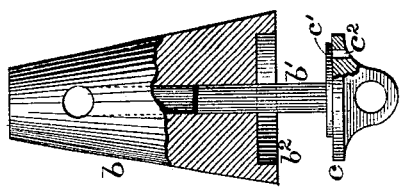
Figure 3:
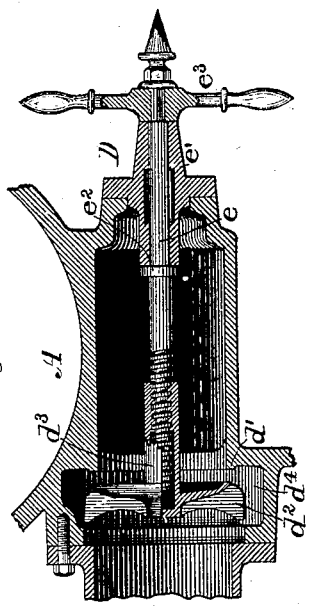
Figure 1:
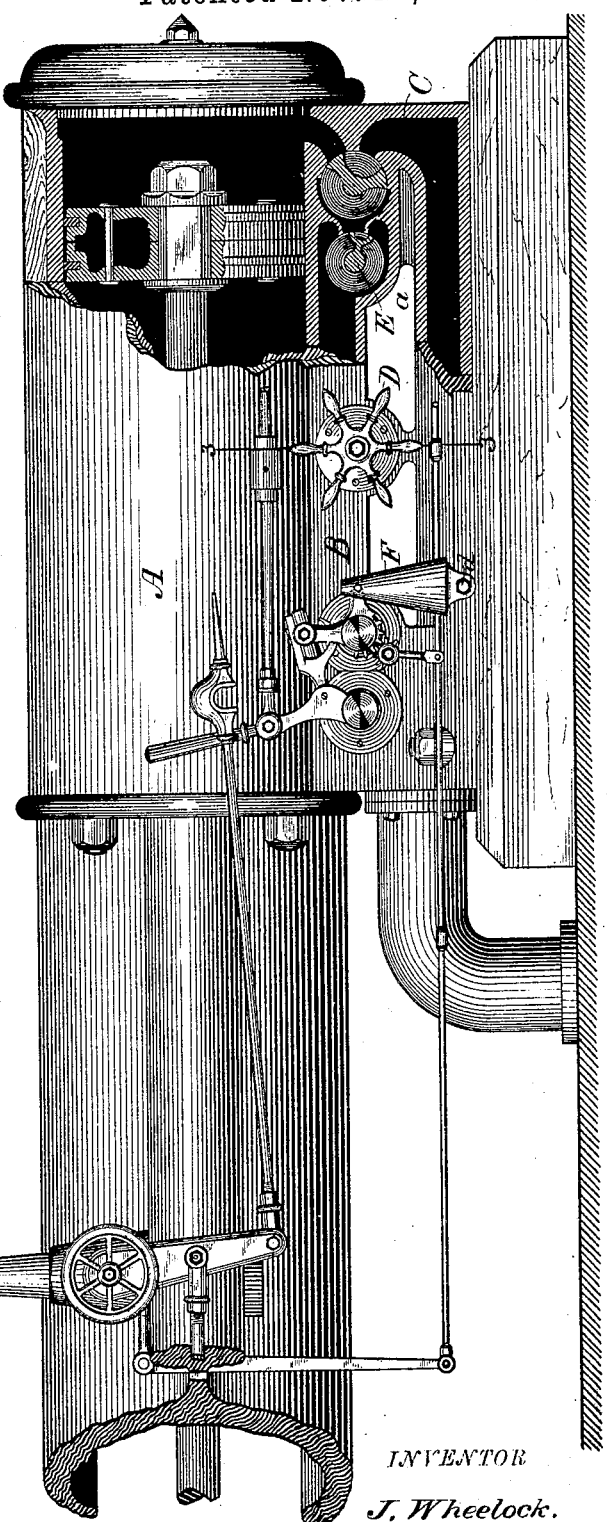

Figure 1 represents, partially in side view and partially in vertical longitudinal section, so much of a steam-engine as is deemed essential for illustrating the application of my improvements thereto. Fig. 2 is an enlarged vertical central section of my improved dash-pot detached. Fig. 3 is a longitudinal central vertical section of a throttle-valve chamber containing a valve constructed in accordance with my invention, said section being on line 3, Fig. 1.

In Figure 1, the cylinder is shown at A, the steam passage, chest, or chamber at B, the exhaust-passage at C, the throttle-valve at D, one set of the induction and exhaust valves at E, and one of the dash-pots at F.

The cylinder and the bed which contains the live-steam passage or steam-chest B and exhaust-passage C is or may be cast integrally. Heretofore in this class of engines these passages have been contained within the bed, but so arranged with reference to each other that a single metal partition separated them, and therefore the contents of either passage were more or less exposed to objectionable variations in temperature due to the close proximity of the other passage. As shown, I have separated these passages by the air-space $a$, each passage therefore having a wall which is insulated from the coincident wall of the other by said space. I find this insulation of these passages from each other, as to heat, of great practical value in the economic working of the engine. The construction of the separated passages, as described, also obviates all necessity for providing special feet or standards for the cylinder.

The dash-pot F embodies in part the frusto-conical weight $b$, which is connected to and suspended, as usual, from an arm or lever on the outer end of the rock-shaft on which the cut-off valve is mounted; but instead of said weight being freely suspended, as heretofore in engines not built by me, it is provided with a central stem, $b'$, on which the weight freely rises and falls, and said stem at its lower end is secured centrally to a base-plate, $c$, which is mounted upon a horizontal pivot, $d$, projecting from the side of the bed of the engine. The base-plate $c$ is in the form of a disk, having a valve, $c'$, on its upper side, which guards an air-induct, $c^2$, located near the periphery of the base-plate. The lower end of the weight $b$ is circularly recessed, as at $b^2$, to serve as an air-chamber to which the circular base-plate is accurately fitted.

It will be readily seen that during the vertical and vibratory movements of the weight it always maintains the same axial relations to the base-plate, and that when the weight falls it is accurately guided by the stem, so as to house the bed-plate in the recess and provide for the desired cushioning effect due to the air compressed in said recess, and also that when the weight rises the valve, by freely admitting air, obviates the resistance to separation which would otherwise be due to the partial vacuum within the recess.

The dash-pot constructed as shown and described, but without the valve $c'$ and the air-induct $c^2$, is illustrated in English Letters Patent No. 2,965 of A. D. 1878, the same having been issued upon a communication from me.

The throttle-valve D is located centrally in the steam passage or chest, the steam-pipe being connected at the side opposite to that shown in Fig. 1, and as clearly indicated in Fig. 3, in which the valve-plate $d$ is shown partially in side view and partly in section.

The valve-seat $d'$ is outside of the steam-chest and readily accessible on removal of the steam-pipe. Said valve-plate has cast integrally therewith the wings $d^2$ and the hollow internally-threaded hub $d^3$.

The valve-stem $e$ is housed in a sleeve or cap, $e'$, detachable from the chest, and is secured therein longitudinally by the inside collar, $e^2$, and the hand-wheel $e^3$, which respectively bear against the inner and outer ends of the sleeve of cap $e'$.

The valve-plate $d$ is prevented from rotation on the stem by means of the ends of the wings on the back of the plate, said wings having a sidewise contact with flanges or webs, as at $d^4$, provided for that purpose.

It will be seen that at all times steam-pressure is exerted against the back of the valve. The threaded stem being rotative and unpacked, this valve possesses all of the desirable qualities of what are known as "loose valves" without the heretofore constant tendency to leak around the stem, because the endwise pressure on the valve-plate serves to tightly force the inside collar against the coincident seat of the sleeved cap, and the pressure will always be outward, regardless of the variation in pressure on the opposite faces of the valve-disk.

I am well aware that faucets, cocks, and stop-valves have heretofore embodied more or less of the general features of construction involved in my throttle-valve; and I do not therefore claim any special portion or portions thereof, but limit myself to the valve as organized by me in combination with the steam-chest, substantially as indicated.

Having thus described my invention, I claim as new and desire to secure by Letters Patent—

1. The combination, within a cylinder-bed, of a steam chest or passage for direct steam and a passage or chamber for exhaust, these being separated and practically insulated from each other as to heat, substantially as described.

2. The air-cushioned dash-pot embodying, in combination, the recessed weight and the pivoted central spindle provided with the base-plate and valve, substantially as described.

3. The combination, with the steam-chest, of a seat for a throttle-valve outside of said chest, the valve-plate provided with wings and prevented from rotation, and the rotative valve-stem tapped into the hub of the valve-plate and provided with a collar for packing against the housing for the stem, substantially as described.

JEROME WHEELOCK.

Witnesses:
A. H. RAYNAL,
E. KIMMEL.